United States Patent Office 3,733,300
Patented May 15, 1973

3,733,300
PROCESS FOR PRODUCING GLASS FIBER-REINFORCED POLYPROPYLENE MOLDED ARTICLE
Toshihito Fujita, Nobuyuki, Takao, and Atsuki Kodama, Fukushima, Japan, assignors to Nito Boseki Co., Ltd., Gonome, Fukushima-shi, Japan
No Drawing. Filed Aug. 12, 1971, Ser. No. 171,361
Claims priority, application Japan, Aug. 15, 1970, 45/71,493
Int. Cl. C08f 45/10
U.S. Cl. 260—41 AG                10 Claims

ABSTRACT OF THE DISCLOSURE

When a stereoregular polypropylene and a silane-treated glass fiber are subjected to heat-molding under pressure in the presence of an organic peroxide and a vinyl compound having at least two carbon to carbon double bonds, the glass fiber is strongly bonded to the polypropylene, whereby a glass fiber-reinforced polypropylene molded article improved in both dry and wet bending strengths is produced.

---

This invention relates to a process for producing a glass fiber-reinforced polypropylene molded article. More particularly, the invention pertains to a process for producing a stereoregular polypropylene molded article, especially a laminate which has been reinforced with a silane-treated glass fiber.

Heretofore, attempts have been made to produce molded articles of various thermoplastic synthetic resins which have been reinforced with glass fibers, and many of said attempts have already been successful. As the said glass fibers, there have frequently been used those which have been surface-treated with a surface-treating agent having a functional group capable of easily reacting with the synthetic resin materials and a functional group capable of easily reacting with the glass fibers, for example, a silane type treating agent, such as γ-aminopropyl triethoxysilane, γ-methacryloxypropyl trimethoxysilane, γ-glycidoxypropyl trimethoxysilane or the like (refer to U.S. Pats. Nos. 3,306,800; 3,441,466 and 3,454,454). However, in case the thermoplastic synthetic resin to be reinforced with the said glass fiber is chemically inactive in its structure, like a stereo-regular polypropylene, there is encountered such a drawback that even when such a silane-treated glass fiber as mentioned above may be used as it is, the resulting molded article is not improved in properties due to insufficient bonding between the glass fiber and the polypropylene.

In order to overcome the above-mentioned drawback, the present invention provides a process in which a silane-treated glass fiber and polypropylene are heat-molded under pressure in the presence of an organic peroxide and a vinyl compound having at least two carbon to carbon double bonds, thereby enhancing the bonding power between the glass fiber and the polypropylene, whereby a more excellent glass fiber-reinforced polypropylene molded article is produced.

A glass fiber-reinforced polypropylene laminate obtained according to the present process can be enhanced by about 60% in dry bending strength and by 85% in wet bending strength as compared with a laminate obtained by molding only the silane-treated glass fiber and the polypropylene.

The polypropylene used in the present invention is a stereoregular polypropylene. As the organic peroxide, there is preferably used, for example, dicumyl peroxide, 2,5 - dimethylhexane-2,5-dihydroperoxide, 2,5 - dimethylhexyne - 2,5 - dihydroperoxide, 2,5-dimethyl - 2,5 - di(t-butylperoxy)hexane or 2,5 - dimethyl-2,5-di(benzoylperoxy)hexane, and as the vinyl compound, there is preferably used, for example, a vinyl compound having at least two carbon to carbon double bonds capable of taking part in radical polymerization and having a boiling point higher than the molding temperatures, such as N,N'-m-phenylene bis-maleimide, N,N'-methylene bis-acrylamide, ethylene dimethacrylate, triethylene glycol dimethacrylate, polyethylene glycol dimethacrylate, diallyl phthalate, trimethylolpropane trimethacrylate or the like.

The amount of the organic peroxide used in the present invention is $1 \times 10^{-3}$ to $10 \times 10^{-3}$ mole, preferably $2 \times 10^{-3}$ to $5 \times 10^{-3}$ mole, per kilogram of the polypropylene, and the amount of the vinyl compound is equal to or more than the amount of the organic peroxide, and is preferably in the range of from 1 to 5 moles per mole of the organic peroxide.

The molded article of the present invention can be produced in such a manner that an organic solvent solution of the aforesaid organic peroxide and vinyl compound is sprayed onto a silane-treated glass fiber and a powdery polypropylene to uniformly wet the whole, the solvent is removed at such a low temperature as not to bring about any reaction, and then the two are subjected together to heat-molding under pressure according to a conventional procedure, for example, at 180° C.–260° C., preferably 200° C.–230° C. at a pressure of 50–300 kg./cm.². Alternatively, there may, of course, be adopted such a procedure that the powdery polypropylene is added to the above-mentioned organic solvent solution of peroxide and vinyl compound with stirring at room temperature, the resulting slurry is further stirred to remove the solvent by vaporization, and then the residue is heat-molded under pressure together with the silane-treated glass fiber, or such a procedure that the silane-treated glass fiber is immersed in the said solvent solution of peroxide and vinyl compound, the solvent is removed and then the residue is heat-molded under pressure together with the powdery polypropylene.

According to the present invention, a polypropylene and a silane-treated glass fiber are heat-molded under pressure in the presence of an organic peroxide and a vinyl compound having at least two carbon to carbon double bonds, as mentioned above, whereby the glass fiber and the polypropylene are firmly bonded to each other. This is considered to be ascribable to the fact that a functional group in the silane type treating agent, which group easily reacts with a glass fiber, firmly bonds to the glass fiber, while the other functional group, which easily reacts with a synthetic resin material, bonds to the unsaturated group of the vinyl compound having at least two carbon to carbon double bonds which can be split by an organic peroxide catalyst, and at the same time, the presence of a suitable radical source, i.e., the organic peroxide, results in a radical reaction between the chemically inactive polypropylene and the specific compound, thereby strongly bonding to the glass fiber.

The present invention is illustrated in further detail below with reference to examples.

EXAMPLE 1

To a solution of 0.81 g. of dicumyl peroxide and 1.61 g. of N,N'-m-phenylene bis-maleimide in 500 g. of acetone was added with stirring 1,000 g. of a stereoregular powdery polypropylene having a reduced viscosity of 1.42 (dl./g.) as measured in 0.1% decahydronaphthalene solution at 130° C. The resulting slurry was occasionally stirred to completely vaporize the acetone at room temperature, whereby a homogeneous mixture was formed. On the other hand, a glass textile of 20 x 20 cm. in size, which had already been degreased, was immersed in a 1% aqueous solution of γ-aminopropyl triethoxysilane, taken up from the solution, dried at room temperature, and the placed in an oven for about 30 minutes at about 120° C.

Over the thus treated glass fiber fabric was uniformly spread 10 g. of the above-mentioned homogeneous polypropylene-vinyl compound mixture. This operation was repeated to form a laminate comprising 7 layers of the glass fiber fabric which had been alternately piled on 8 layers of the polypropylene-vinyl compound mixture. The laminate was placed in a molding machine heated at 205° C., and a pressure of 250 kg./cm.$^2$ was applied thereto. Thereafter, the laminate was transferred to a water-cooled press and cooled under pressure to prepare a laminate of about 3 mm. in thickness.

The thus prepared laminate contained about 50% by weight of the glass textile, and had a dry bending strength of 19.1 kg./mm.$^2$ and a wet bending strength of 17.8 kg./mm.$^2$ as measured according to the test method of JIS K–6911.

For comparison, another laminate was prepared in the same manner as above, except that the dicumyl peroxide and N,N'-m-phenylene bismaleimide were not used. This laminate had a dry bending strength of 11.5 kg./mm.$^2$ and a wet bending strength of 9.3 kg./mm.$^2$. From this, it is understood that a marked improvement could be made according to the present process.

EXAMPLE 2

A glass fiber fabric, which had been treated in the same manner as in Example 1, except that γ-methacryloxypropyl trimethoxysilane was used in place of the γ-aminopropyl triethoxysilane, was laminated on a stereoregular polypropylene sheet, while spraying sufficiently uniformly a solution of 0.76 g. of dicumyl peroxide and 1.57 g. of N,N'-m-phenylene bis-maleimide in 500 g. of acetone. This operation was repeated to laminate 7 layers of the glass fiber fabric alternately on 8 layers of the polypropylene resin sheet. Subsequently, the acetone was volatilized at such a low temperature that no reaction took place, and then the same molding operation as in Example 1 was effected to prepare a laminate.

The thus prepared laminate had a dry bending strength of 17.6 kg./mm.$^2$ and a wet bending strength of 15.6 kg./mm.$^2$. On the other hand, a laminate, which had been prepared in the same manner as above, except that the dicumyl peroxide and N,N'-phenylene bis-maleimide were not used, had a dry bending strength of 9.7 kg./mm.$^2$ and a wet bending strength of 9.0 kg./mm.$^2$.

EXAMPLE 3

A degreased glass fiber fabric, which had been treated with a 1% aqueous γ-aminopropyl triethoxysilane solution, was dipped in an acetone solution containing 0.22% of dicumyl peroxide and 0.44% of N,N'-m-phenylene bis-maleimide, and taken up from the solution, and then the acetone was volatilized at room temperature.

The thus treated glass fiber fabric and a stereoregular polypropylene were laminated and molded in the same manner as in Example 1 to prepare a laminate.

This laminate had a dry bending strength of 19.7 kg./mm.$^2$ and a wet bending strength of 17.6 kg./mm.$^2$. On the other hand, a laminate, which had been prepared in the same manner as above except that the glass textile had been subjected to only the silane treatment, had a dry blending strength of 11.5 kg./mm.$^2$ and a wet bending strength of 9.2 kg./mm.$^2$.

EXAMPLE 4

A laminate was prepared in the same manner as in Example 1, except that vinyl-tris(β-methoxyethoxy)silane was used in place of the γ-aminopropyl triethoxysilane. This laminated plate had a dry bending strength of 17.1 kg./mm.$^2$ and a wet bending strength of 17.3 kg./mm.$^2$. On the other hand, a laminate, which had been prepared in the same manner as above except that the peroxide and vinyl compound were not used, had a dry bending strength of 11.1 kg./mm.$^2$ and a wet bending strength of 10.5 kg./mm.$^2$.

EXAMPLE 5

A glass fiber fabric, which had been treated with γ-aminopropyl triethoxysilane, was dipped in acetone having dissolved therein 0.86 g. of 2,5-dimethyl-2,5-di(5-butylperoxy)hexane as a peroxide and 1.61 g. of N,N'-m-phenylene bis-maleimide as a vinyl compound, and then treated in the same manner as in Example 1 to prepare a laminate.

The thus prepared laminate had a dry bending strength of 18.0 kg./mm.$^2$ and a wet bending strength of 15.6 kg./mm.$^2$, and had been enhanced by 71% and 49% in dry and wet bending strengths, respectively, as compared with a laminate prepared in the same manner as above except that the peroxide and vinyl compound were not used.

EXAMPLE 6

1,000 grams of a stereoregular powdery polypropylene having a reduced viscosity of 1.73 dl./g. as measured in 0.1% decahydronaphthalene solution at 130° C., 3×10$^{-3}$ mole of dicumyl peroxide as an organic peroxide and 6×10$^{-3}$ mole of each of the 5 kinds of vinyl compounds shown in the table below were mixed together in the same manner as in Example 1 to prepare a slurry.

On the other hand, a glass fiber fabric was dipped in a 1% aqueous solution of vinyl-tris(β-methoxyethoxy)silane, taken up from said solution and then dried.

The thus treated glass fiber fabric and the aforesaid slurry were alternately laminated on each other in the same manner as in Example 1 to obtain a laminate.

Each of the laminates obtained in the above manner had such bending strengths as shown in the table below. The content of the glass textile in each laminated plate was 50±2% by weight.

| Vinyl compound | Dry bending strength (kg./mm.$^2$) | Wet bending strength (kg./mm.$^2$) |
| --- | --- | --- |
| Methylene bis-acrylamide | 20.7 | 19.2 |
| Ethylene glycol dimethacrylate | 21.1 | 19.4 |
| Diallyl phthalate | 20.6 | 18.4 |
| Trimethylolpropane trimethacrylate | 20.8 | 20.3 |
| m-Phenylene bis-maleimide | 23.5 | 20.0 |
| Laminate prepared by using neither peroxide nor vinyl compound (set forth in Example 1) | 11.5 | 9.3 |

As is clear from the above table, the laminates according to the present process had been markedly enhanced in bending strength, and particularly the laminate having incorporated thereinto m-phenylene bis-maleimide showed excellent results.

What is claimed is:

1. A process for producing a glass fiber-reinforced polypropylene molded article which comprises heat-molding under pressure according to a known procedure a stereoregular polypropylene and a silane-treated glass fiber in the presence of an organic peroxide and the vinyl compound N,N'-m-phenylenebis maleimide.

2. A process according to claim 1, wherein the amount of the organic peroxide is 1×10$^{-3}$ to 10×10$^{-3}$ mole per kilogram of the polypropylene.

3. A process according to claim 1, wherein the amount of the organic peroxide is 2×10$^{-3}$ to 5×10$^{-3}$ mole per kilogram of the polypropylene.

4. A process according to claim 1, wherein the organic peroxide is dicumyl peroxide, 2,5-dimethylhexane-2,5-dihydroperoxide, 2,5 - dimethylhexyne-2,5-dihydroperoxide, 2,5-dimethyl-2,5-di(t-butylperoxy)hexane or 2,5-dimethyl-2,5-di(benzoylperoxy)hexane.

5. A process according to claim 1, wherein the organic peroxide is dicumyl peroxide.

6. A process according to claim 1, wherein the organic peroxide is 2,5-dimethyl-2,5-di(t-butylperoxy)hexane.

7. A process according to claim 1, wherein the amount of the vinyl compound is 1 to 5 moles per mole of the organic peroxide.

8. A process according to claim 1, wherein the silane-treated glass fiber is a glass fiber treated with γ-aminopropyl triethoxysilane, γ-methacryloxypropyl trimethoxysilane or vinyl-tris(3-methoxyethoxy)silane.

9. A glass fiber-reinforced polypropylene molded article obtained according to the process as set forth in claim 1.

10. A process in accordance with claim 1 comprising first mixing said polypropylene with 0.001 to 0.01 mole of said peroxide per kilogram of polypropylene and 1–5 moles of said vinyl compound per mole of said peroxide, then carrying out said heat molding at a temperature of 180–260° C. and a pressure of 50–300 kg./cm.$^2$.

References Cited

UNITED STATES PATENTS

| | | | |
|---|---|---|---|
| 3,471,439 | 10/1969 | Bixler | 106—308 Q |
| 3,519,594 | 7/1970 | Michaels | 106—308 Q |
| 3,519,593 | 7/1970 | Bolger | 260—41 A |
| 3,472,729 | 10/1969 | Sterman | 260—41 AG |
| 3,013,915 | 12/1961 | Morgan | 260—41 AG |

MORRIS LIEBMAN, Primary Examiner

P. R. MICHL, Assistant Examiner